United States Patent
Steele et al.

(10) Patent No.: US 10,807,420 B2
(45) Date of Patent: Oct. 20, 2020

(54) DUAL TIRE PRESSURE MONITOR AND WHEEL TORQUE SENSOR FOR VEHICLES

(71) Applicant: Robert Bosch GmbH, Stuttgart (DE)

(72) Inventors: Samuel Steele, Ypsilanti, MI (US); Kevin M. Danford, Ann Arbor, MI (US)

(73) Assignee: Robert Bosch GmbH, Stuttgart (DE)

( * ) Notice: Subject to any disclaimer, the term of this patent is extended or adjusted under 35 U.S.C. 154(b) by 246 days.

(21) Appl. No.: 15/926,387

(22) Filed: Mar. 20, 2018

(65) Prior Publication Data

US 2019/0291518 A1    Sep. 26, 2019

(51) Int. Cl.
*B60C 23/04* (2006.01)
*G01L 5/162* (2020.01)
*B60C 23/06* (2006.01)

(52) U.S. Cl.
CPC ...... *B60C 23/0481* (2013.01); *B60C 23/0408* (2013.01); *B60C 23/0476* (2013.01); *B60C 23/0486* (2013.01); *B60C 23/06* (2013.01); *G01L 5/162* (2013.01)

(58) Field of Classification Search
CPC .................................................. B60C 23/06
See application file for complete search history.

(56) References Cited

U.S. PATENT DOCUMENTS

| | | | |
|---|---|---|---|
| 5,894,094 A | 4/1999 | Kuchler et al. | |
| 6,591,672 B2 * | 7/2003 | Chuang | B60C 23/0408 73/146.8 |
| 7,104,616 B2 | 9/2006 | Zierolf | |
| 7,418,362 B2 | 8/2008 | Shiraishi | |
| 7,559,259 B2 | 7/2009 | Fruhwirth et al. | |
| 9,003,896 B2 | 4/2015 | Nold et al. | |
| 9,068,878 B2 * | 6/2015 | Cash | G01G 19/12 |
| 9,404,820 B2 | 8/2016 | Gutierrez Lopez et al. | |
| 2005/0235744 A1 | 10/2005 | Ogawa | |
| 2008/0160937 A1 | 7/2008 | Baker et al. | |
| 2016/0332493 A1 * | 11/2016 | Atsumi | B60C 23/009 |

FOREIGN PATENT DOCUMENTS

JP    2010264917 A * 11/2010

* cited by examiner

*Primary Examiner* — Matthew G Marini
(74) *Attorney, Agent, or Firm* — Michael Best & Friedrich LLP

(57) ABSTRACT

A dual tire pressure monitoring system (TPMS) and wheel torque sensor system generates a single wireless signal containing both tire pressure data and wheel strain data. The wheel strain data is functionally related to wheel torque. The dual sensor has a transceiver that generates the wireless signal for a remote controller. A body of the dual sensor is positioned on the interior of the wheel under the tire, near the valve stem. The wheel torque is used to control braking, propulsion or steering of a Highly Automated Driving (HAD) vehicle, and to improve vehicle stability control and vehicle diagnostics.

19 Claims, 12 Drawing Sheets

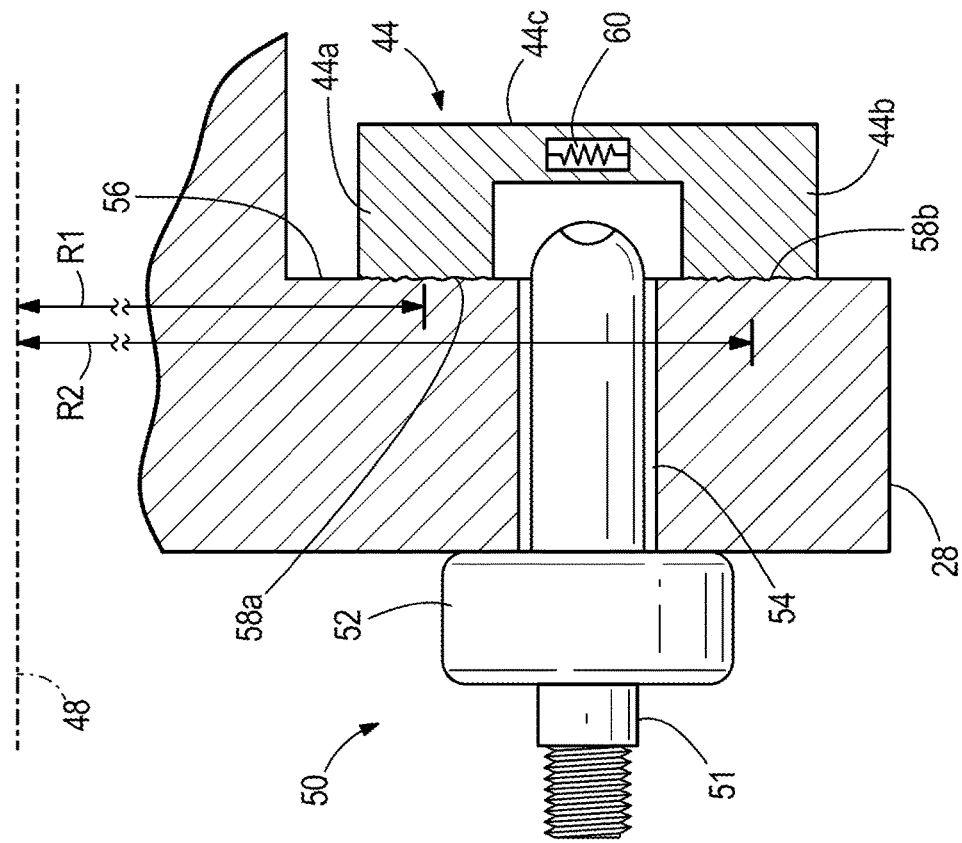
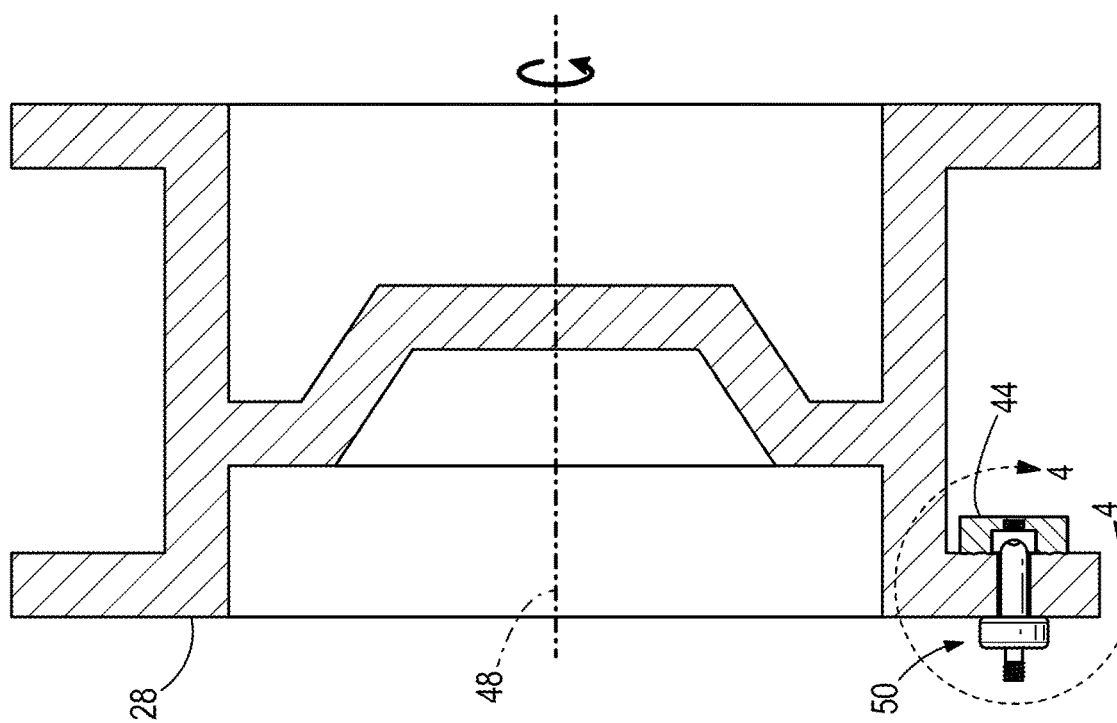
FIG. 4
FIG. 3

DUAL TIRE PRESSURE MONITOR AND WHEEL TORQUE SENSOR FOR VEHICLES

BACKGROUND

Embodiments relate to a combined tire pressure monitor system and wheel torque sensor for vehicles.

Highly automated driving (HAD) vehicles require a virtual driver that is capable of compensating for variations in performance, such as braking, acceleration and steering. In non-HAD or human-driven vehicles, the human driver is responsible for sensing, thinking and acting to achieve the desired vehicular performance.

SUMMARY

One embodiment provides a combined tire pressure monitoring system (TPMS) and wheel torque sensor system for a vehicle such as a highly automated driving (HAD) vehicle. The combined system includes a dual tire pressure sensor and a wheel torque sensor. The dual sensor has a body interconnected with the wheel. A strain sensor and a tire pressure sensor are interconnected with the body of the dual sensor. The dual sensor includes an electronic control unit (ECU) interconnected with the body and configured to receive strain data from the strain sensor. The ECU is also configured to receive pressure data from the tire pressure sensor. The ECU processes the strain data and outputs processed strain data. The ECU also processes the tire pressure data and outputs processed pressure data. The dual sensor also includes a wireless transceiver interconnected with the body and in communication with the electronic control unit, the wireless transceiver being configured to generate a wireless signal that includes the processed strain data and the processed pressure data. A controller, disposed remote from the wheel, is configured to receive the wireless signal from the wireless transceiver.

Another embodiment provides a dual sensor that senses tire pressure and wheel torque of a vehicle wheel. The dual sensor includes a body configured to be interconnected with the wheel, and a strain sensor interconnected with the body. The strain sensor is configured to output strain data related to wheel strain. A tire pressure sensor is also interconnected with body. The tire pressure sensor is configured to output pressure data. The dual sensor also includes an electronic control unit (ECU) interconnected with the body, the electronic control unit being configured to receive the strain data and the pressure data and to output processed strain data and processed pressure data. A wireless transceiver is interconnected with the body and is in communication with the electronic control unit. The wireless transceiver is configured to generate a wireless signal that includes the processed strain data and the processed pressure data.

Another embodiment provides a method of monitoring the tire pressure of a vehicle tire disposed on a vehicle wheel, and sensing a wheel torque of the wheel. The method includes affixing a body of a dual sensor to the wheel, generating strain data from a strain sensor interconnected with the body of the dual sensor, and generating pressure data from a tire pressure sensor interconnected with the body of the dual sensor. The strain data and the pressure data are processed using an electronic control unit that is interconnected with the body. A wireless signal is transmitted to a remote controller using a transceiver interconnected with the dual sensor body. The wireless signal includes both the processed strain data and the processed pressure data.

Other embodiments will become apparent by consideration of the detailed description and accompanying drawings.

BRIEF DESCRIPTION OF THE DRAWINGS

FIG. 3 is a side cross-sectional view of a combined tire pressure sensor, valve and wheel torque sensor according to other embodiments.

FIG. 4 is a detailed side cross-sectional view of a combined tire pressure sensor, valve and wheel torque sensor according to some embodiments, taken along arc 4-4 of FIG. 3.

DETAILED DESCRIPTION

Figure 1:
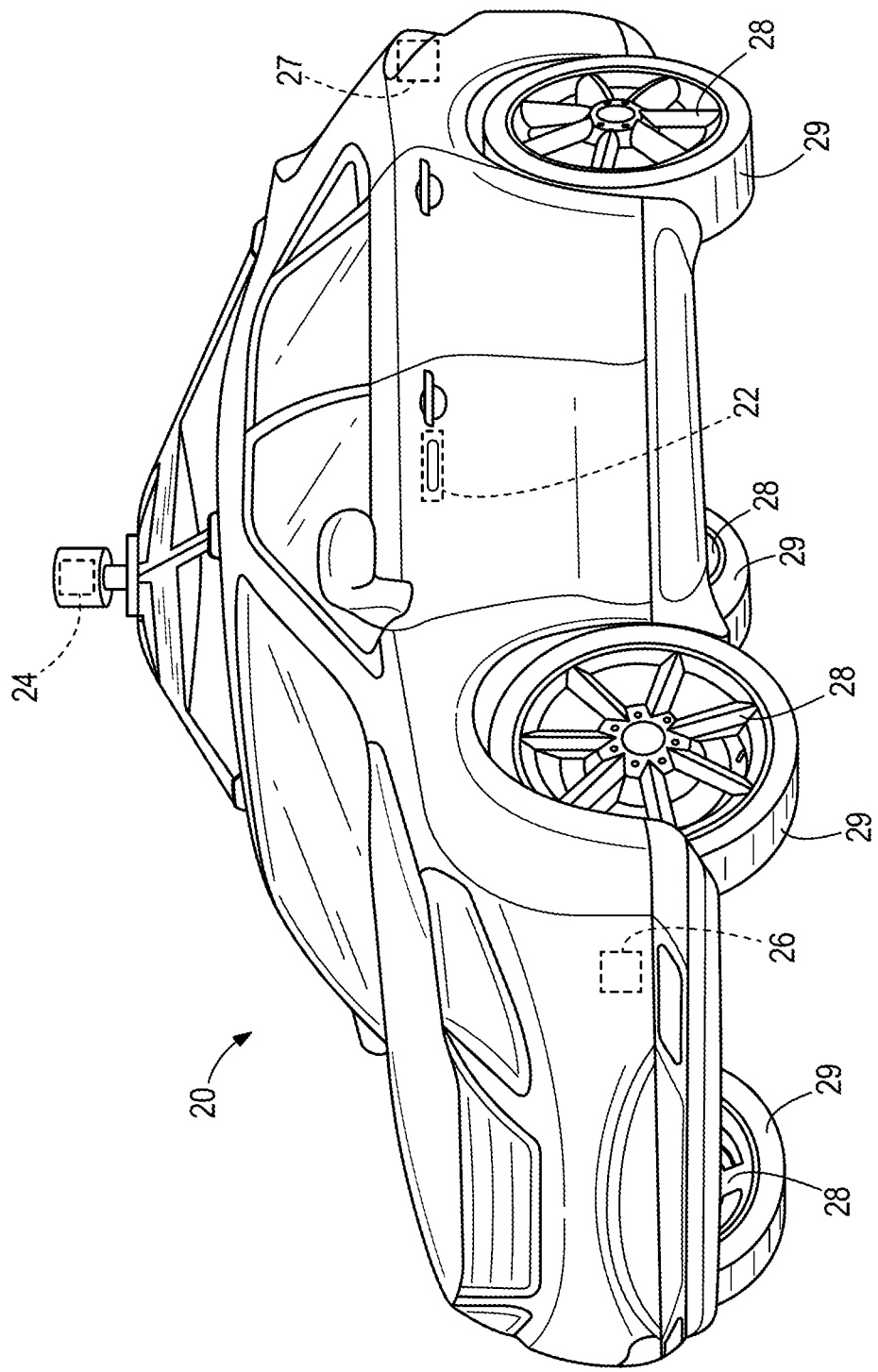
FIG. 1 is a perspective view of a highly automated driven (HAD) vehicle according to some embodiments.

Before any embodiments are explained in detail, it is to be understood that the embodiments are not limited in their application to the details of construction and the arrangement of components set forth in the following description or illustrated in the following drawings. Other embodiments are possible and embodiments are capable being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted", "affixed", "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "processing units" and "controllers" described in the specification can include standard processing components, such as one or more electronic processors, one or more memory modules including non-transitory computer-readable medium, one or more input/output interfaces, and various connections (e.g., a bus) connecting the components.

Many modern vehicles include systems which require precise location and movement information about the vehicle. For example, self-parking vehicles and vehicles which stop themselves in emergencies need precise braking and location information. In addition, highly automated driving (HAD) vehicles have little or no human input; they require a great deal of data about vehicle speed, direction and location to stably control the vehicle. Wheel torque data—obtained from wheel strain data—can be used to provide some of the data needed by modern and HAD vehicles. However, the wheel strain data must be wirelessly transmitted and processed to be usable by vehicular systems. Wheel strain sensor systems have a number of components, thereby increasing the cost and complexity of the vehicles.

Many modern and HAD vehicles also monitor tire air pressure and provide notifications of improper tire inflation. Underinflation and overinflation reduce vehicle efficiency and stability control. These systems require components which process and wirelessly transmit tire pressure data, further increasing the cost and complexity of the vehicle. The dual sensor according to some embodiments disclosed herein reduces cost and complexity of vehicles by providing apparatus and systems which use some of the same components for both a tire pressure monitoring system and a wheel torque sensor.

FIG. 1 depicts a highly automated driving (HAD) vehicle 20 that includes a fingerprint sensor 22 mounted to the exterior of the vehicle 20 for detecting a fingerprint. If the fingerprint matches a fingerprint of a specific authorized individual stored, for example, in a memory, then the vehicle enables vehicle control systems. Thus, in one embodiment, preselected persons obtain access to the HAD vehicle 20. The HAD vehicle 20 includes a laser identification detection and ranging (Lidar) sensor 24 mounted at a top of a vehicle hood to locate objects in plural directions. Further, FIG. 1 shows a frontward directed radar sensor 26 and a rearward directed radar sensor 27. Additional sensors are not illustrated in FIG. 1. The vehicle has wheels 28 with tires 29 thereon.

Figure 2:
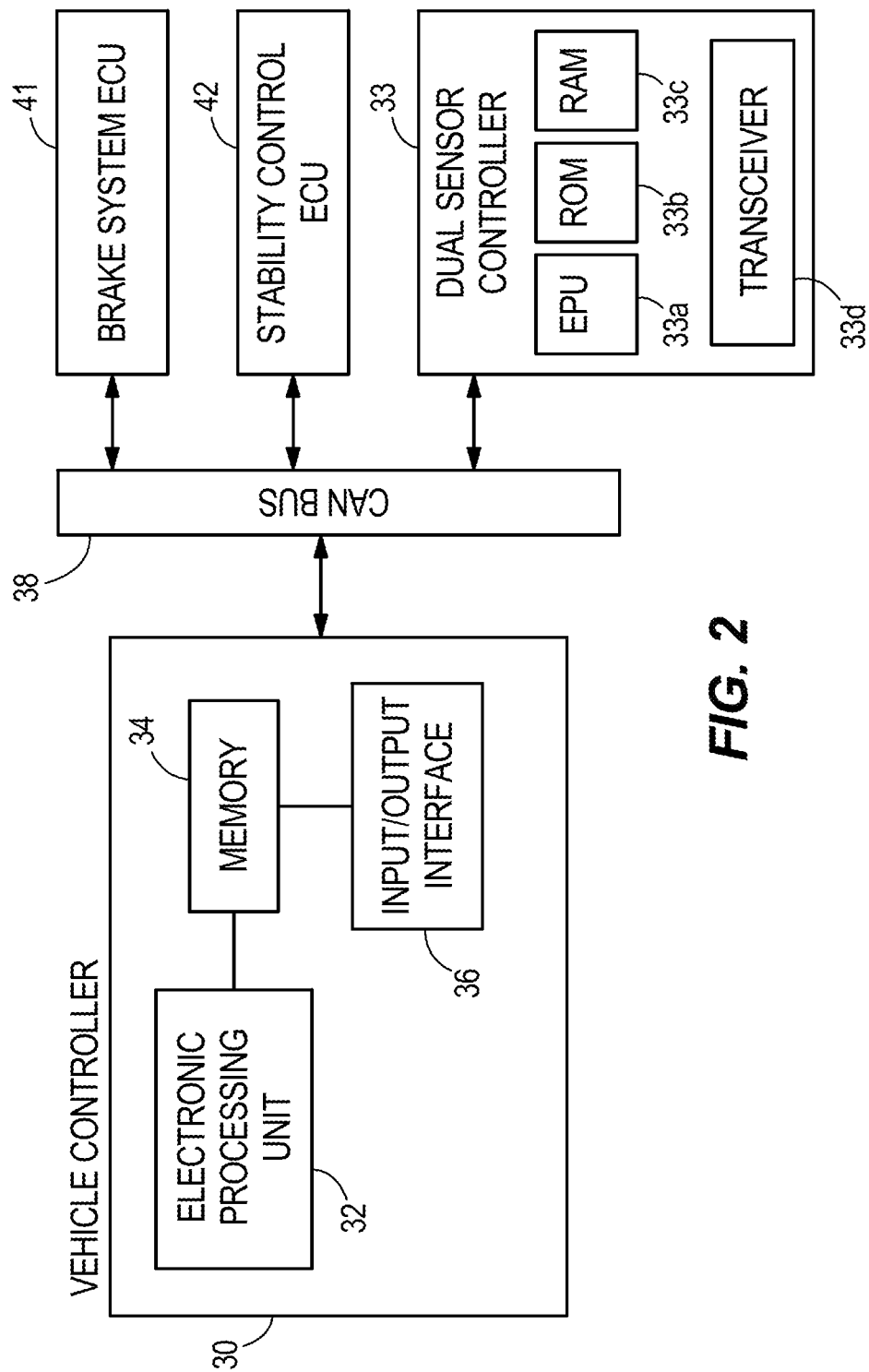
FIG. 2 is a block diagram of a remote vehicle controller, remote dual sensor controller and CAN (controller area network) bus according to some embodiments.

As illustrated in FIG. 2, in one embodiment, the vehicle controller 30 is remote from the wheel-based dual sensor bodies 44, 62 described herein. The vehicle controller 30 includes an electronic processing unit 32 (e.g., one or more microprocessors or other suitable programmable devices), a non-transitory memory 34 and an input/output interface 36. The input/output interface 36 shown in FIG. 2 receives inputs and outputs to and from controller 30. The input/output interface 36 also receives inputs from and controls traffic on a Controller Area. Network (CAN) bus 38 and from a remote dual tire pressure/wheel torque sensor controller 33 described herein. The remote dual sensor controller 33 of the dual sensor system includes an electronic processing unit (EPU) 33a, a non-transient Read Only Memory (ROM) 33b, a volatile random access memory or buffer 33c and a remote wireless transceiver 33d as shown in FIG. 2.

In one embodiment, the input/output interface 36 enables controller 30 and its electronic processing unit 32 to communicate with the electronic control units (ECUs) of various vehicular systems via CAN bus 38. Each electronically-controlled vehicular system has its own ECU. Most of the ECUs which control vehicular systems (e.g. brakes, air bags, steering, anti-lock brakes, transmission, audio, stability control, traction control, cabin heater/air conditioner) are interconnected with CAN bus 38 so that the ECUs can communicate with each other. Two of these ECUs are shown in FIG. 2, namely brake system ECU 41 and stability control ECU 42, it being understood that other vehicular system ECUs are networked in the CAN using CAN bus 38. The input/output interface 36 provides an electrical connection over a communication bus—such as CAN bus 38—or over a wired, wireless, or optical connection that enables the vehicular systems, controllers, and devices to communicate with each other and with ECU 32 using network communications protocols.

The non-transitory memory of the remote dual controller 33 includes a program storage area 33b in its non-transitory read only memory (ROM) 33b and a data storage area 33c or buffer such as a random access memory (RAM)). The electronic processing unit 33a executes software stored in the memory 33b. In some embodiments, memory 33b includes instructions for sending a request signal to a wireless transceiver of the dual sensor system so that the wireless transceiver sends wireless signals at a second, higher rate than normal.

The embodiments herein use a single wireless transceiver in each of the remote controller 33 and the wheel-based portion of the dual sensor system. Each of these wireless transceivers is used for both a tire pressure monitoring system (TPMS) and a wheel torque sensor. The wireless transceiver on the wheel-based portion transmits a combined signal having both tire pressure data and wheel strain data, so that only a single transceiver is used on the wheel for both the TPMS and the wheel torque sensor See FIG. 5. Strain data from the strain sensor is converted to wheel torque. The wheel torque data includes x-direction (propulsion) information that is used in a feedback loop to determine how much additional brake force is required to slow the vehicle and control vehicle performance. The wheel torque data also includes lateral side loading information, which is usable for vehicle stability control, traction control, anti-lock braking (ABS) systems, steering systems, and path planning systems. The wheel torque data are also usable for vehicle diagnostics, by comparing estimated propulsive system torque to the directly-measured wheel torque as described herein. The wheel torque data can be used for additional vehicle diagnostics, including brake hardware failures (e.g. hydraulic leaks, overheating, friction pad failure, and brake caliper failure), and steering hardware failures (e.g. steering tie rod failure and vehicle suspension failure). In some embodiments, the combined TPMS and wheel torque sensor system is compact because many of the components of the dual sensor are interconnected with the same dual body.

FIG. 3 is a side cross-sectional view of a combined TPMS and wheel torque sensor apparatus, according to some embodiments. In FIG. 3, a dual sensor body 44 is interconnected with wheel 28 near a radially outward part of wheel 28 with reference to the wheel's axis of rotation 48.

Figure 5:
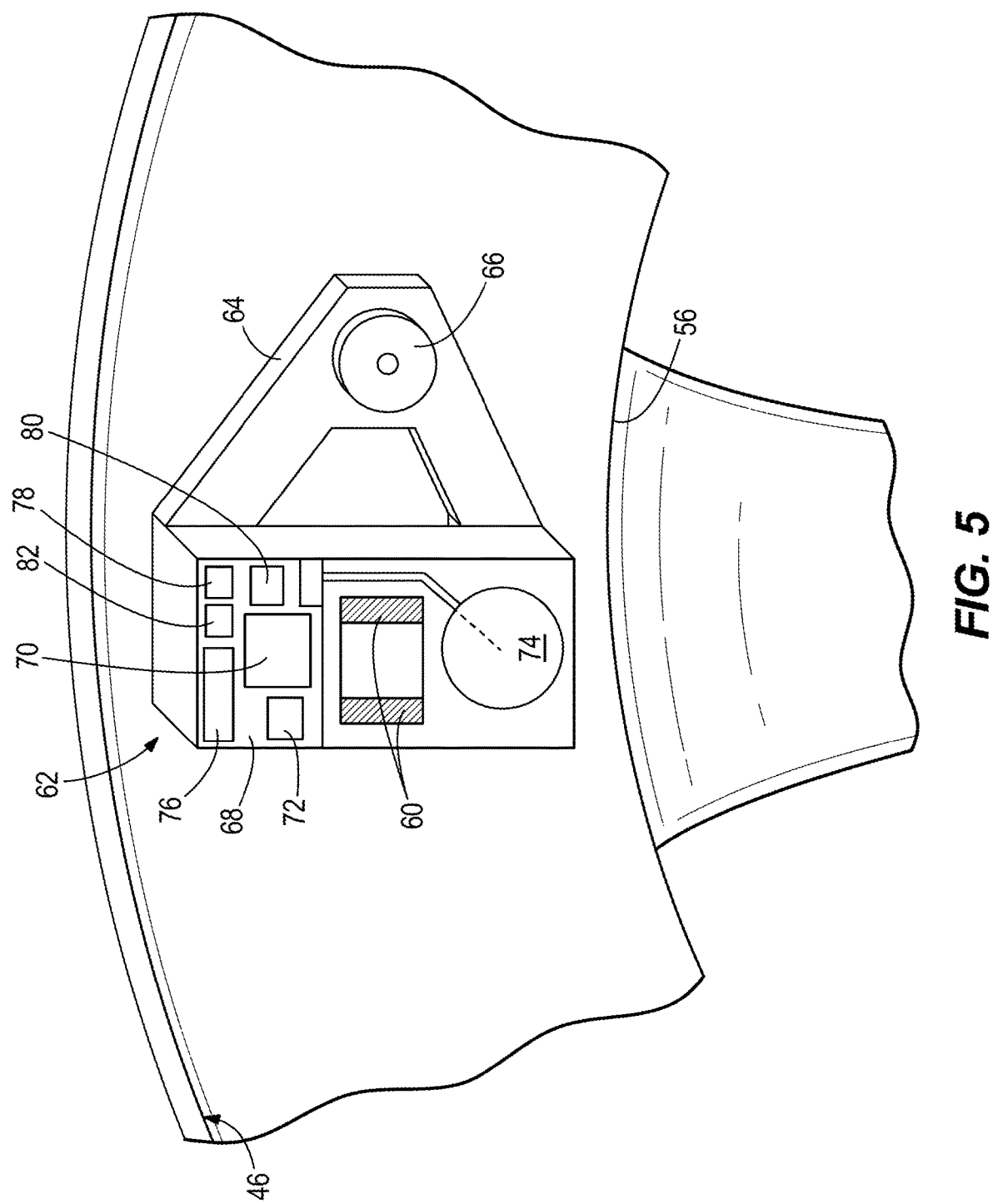
FIG. 5 depicts a combined tire pressure sensor and wheel torque sensor according to some embodiments.

FIG. 4 is a detailed side cross-sectional view of a combined tire pressure sensor, valve and wheel torque sensor according to some embodiments, taken along arc 4-4 of FIG. 3. In FIG. 5, a Schrader-type fluid valve 50 is interconnected with a tire pressure sensor. The Schrader valve includes a valve stem 52 that has a valve core. The valve core includes a poppet valve 51 having a spring. As shown in FIG. 4, valve stem 52 is received in an aperture 54 of wheel 28.

In FIG. 4, dual sensor body 44 is epoxy-glued or otherwise affixed to the interior side 56 of wheel 28 below the tire 29. Sensor body 44 has a first leg 44a that is affixed to interior side 56 at a first point 58a, and a second leg 44b that is affixed to interior side 56 at a second point 58b. First leg 44a and second leg 44b are connected by a cross member 44c of sensor body 44. In some embodiments, Sensor body 44 is disposed opposite to valve stem 52 in order to bridge aperture 54 that receives valve stem 52.

As shown in FIG. 4, first point 58a is disposed at first radial distance R1 from the wheel's axis of rotation 48. and second point 58b is disposed at a second radial distance R2 from the axis of rotation 48, where second radial distance R2 is greater than first radial distance R1. The difference in radial distances is important for proper operation of the strain transducer or sensor in some embodiments. In FIG. 4, the strain sensor includes at least one strain gauge 60 that is affixed to cross member 44c so that wheel strain acts upon the strain sensor to generate strain data. The electronics and operation of the embodiment shown in FIG. 4 are similar to the electronics and operation of the FIG. 5 embodiment, discussed below.

In FIG. 5, dual sensor body 62 is attached to the interior side 56 of wheel 28 below tire 29 in a manner similar to the manner described in connection with FIG. 4. In FIG. 5, at least two strain sensors—such as strain gauge 60 shown in FIG. 6—are interconnected with sensor body 62. The orientations of strain sensors 60 in the FIG. 5 embodiment are similar to the orientation of strain sensor 60 in the FIG. 4 embodiment.

In FIG. 5, a bracket 64 interconnects sensor body 62 and a valve stem 66. An electronics control board (ECB) 68 is interconnected with sensor body 62. Disposed on or otherwise interconnected with ECB 68 are the following components:

central processing unit (CPU) or electronic processor 70;
an application specific integrated circuit (ASIC) 72 which includes a strain amplifier that amplifies the strain signal from strain gauge 60 or other strain sensor;
a random access memory (RAM) or other volatile memory;
a non-transient or non-volatile memory (NVM) that stores instructions for the combined TPMS and wheel torque sensor system. including at least one calibration lookup table and program execution steps;
a battery 74 to supply power to the electronics, such as a type CR2032 battery;
a power regulator that controls the power supplied to ECB 68 and its components;
a wireless transceiver 76 that communicates with the electronic processor 33a and remote controller 33;
an antenna for the wireless transceiver 76;
a tire pressure sensor 78 that senses the pressure of the fluid (e.g. air, nitrogen) in the tire;
a temperature sensor 82 that senses ambient temperature;
an inertial measurement unit (IMU) 80, that includes an accelerometer which measures acceleration forces along three major axes (e.g. Fx, Fy and Fz). The IMU 80 also includes a gyroscopic sensor that measures orientation with reference to three major axes (x, y and z).

The embodiment depicted in FIG. 4 has similar components to the embodiment of FIG. 5, but in a different configuration. In FIG. 4, the dual sensor body is positioned opposite the valve stem aperture, whereas the FIG. 5 embodiment has the valve stem oriented adjacent to the dual sensor body.

In operation, strain data is generated from one or more strain sensors 60 interconnected with body 62 of the dual sensor. Tire pressure data is generated by pressure sensor 78. Temperature data is generated by a temperature sensor 82 interconnected with body 62. The strain data is amplified by the strain amplifier of ASIC 72. The strain data, pressure data and temperature data are normalized and otherwise processed by ECU 70 of the dual sensor system. The processed strain data and processed pressure data are transmitted in a wireless signal via wireless transceiver 76 to the remote wireless transceiver 33d of remote controller 33 of the dual sensor system. The wireless signal includes the processed strain data and the processed sensor data.

Battery drain of battery 74 is reduced by transmitting the wireless signal at a low frequency (e.g. 0.1-1.0 Hz). Although strain data and pressure data are being continually generated while the vehicle is running or moving, wireless signals containing processed strain data and processed pressure data need not be not continuously transmitted. In some embodiments, the remote controller 33 sends a request signal via its wireless transceiver 33d to wireless transceiver 76 when vehicle controller 30 determines that a significant event is occurring (e.g. vehicle braking, vehicle instability or loss of traction in a wheel). Other vehicle systems typically require a higher frequency input than the normal low frequency transmission of the wireless transmitter 76. In response to the request signal, wireless transceiver 76 transmits the wireless signal at a higher rate (e.g. in a burst) to controller 33 and then reverts to transmission at a lower rate.

The processed strain data is used by the ECU 41 of the vehicle braking system to determine the magnitude of braking force to be applied to the vehicle wheels, particularly in a HAD vehicle. In some embodiments, remote controller 33 generates a message corresponding to the processed strain data on the CAN bus 38 so that one or more ECUs of other vehicle systems can use the processed strain data. For example, processed strain data relating to one or more strain sensors 60 can be used by the ECUs of the vehicular anti-lock braking system, stability control system, and traction control system.

Figure 6:
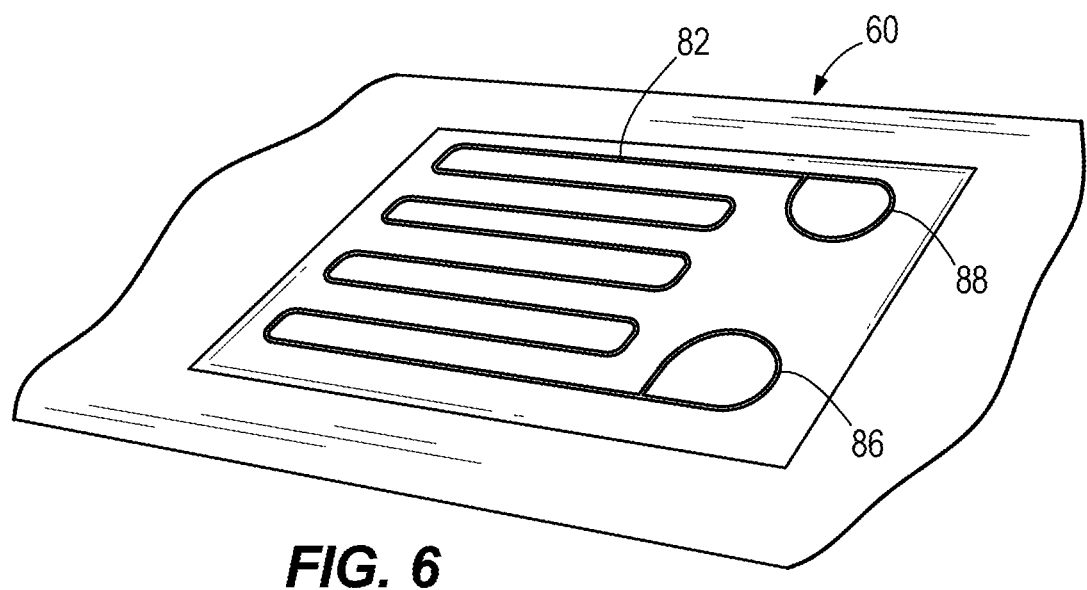
FIG. 6 illustrates a strain gauge that is used in some embodiments.

FIG. 6 illustrates a strain gauge type of strain sensor that is used in some embodiments, including the embodiments of FIGS. 5 and 6. A piezoelectric sensor may alternately be used in some embodiments. The strain gauges 60 and sensor body 44, 62 deflect in response to wheel torque. In FIG. 6, strain gauge 60 has an electrical trace 84 in a pattern that is sensitive to tension and compressive strains of the wheel 28. The resistance across first terminal 86 and second terminal 88 changes in response to elongation (tension strain; increase in resistance) and compression (compressive strain; decrease in resistance) of the electrical trace 84 and thus change the orientation of the sensor body 44, 62. These resistance changes correspond to wheel strain, which is functionally related to wheel torque.

Figure 7:
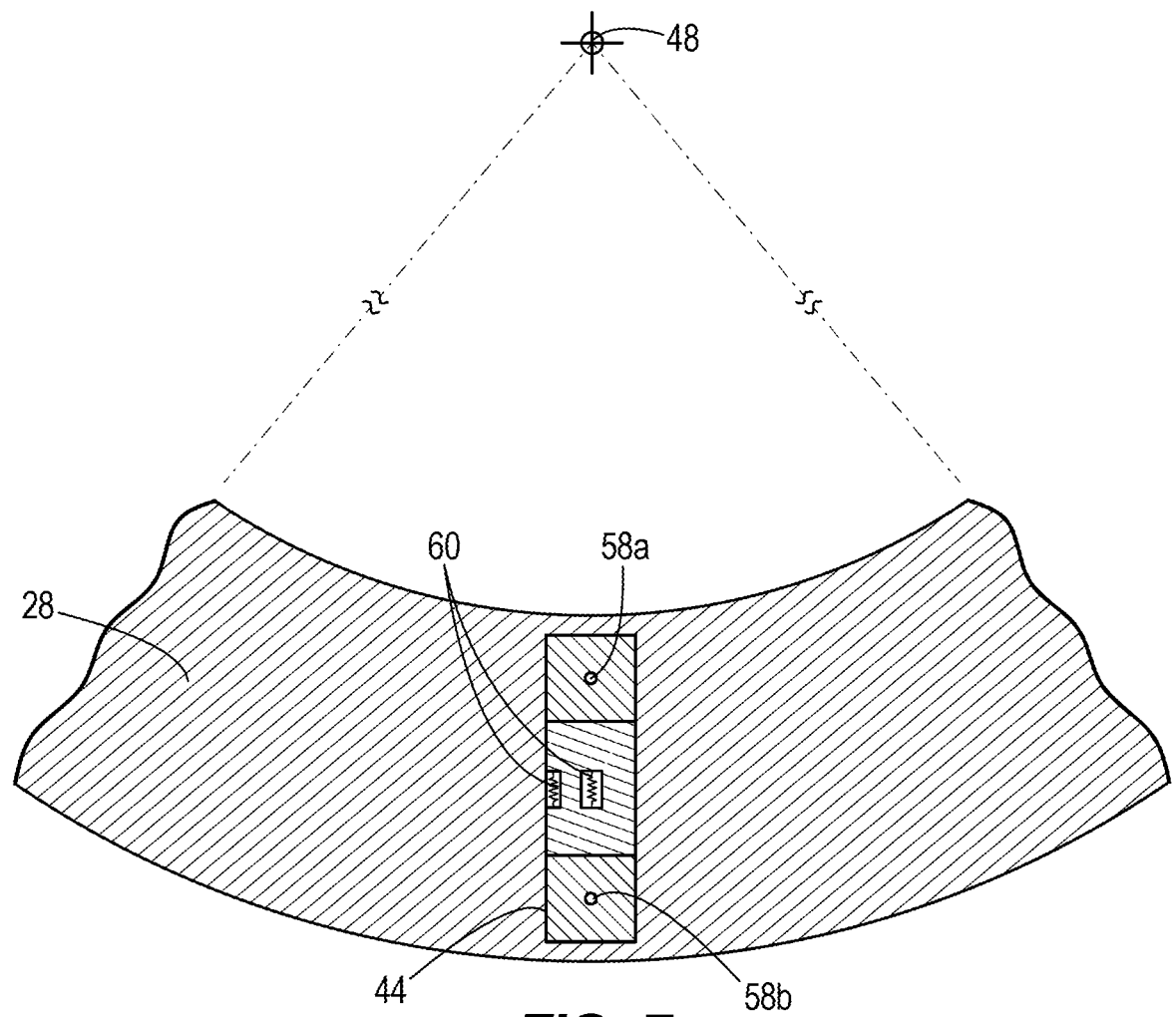
FIG. 7 is a rear view of the wheel torque sensor when the wheel is stationary according to some embodiments.

FIG. 7 is a rear view of the sensor body 44, 62 when the wheel is stationary according to some embodiments. As shown in FIG. 7, there is no deflection of dual sensor body 44, 62 due to vehicle propulsion (the vehicle is stationary) so that first point 58*a* and second point 58*b* are positioned on the same vertical line.

Figure 8:
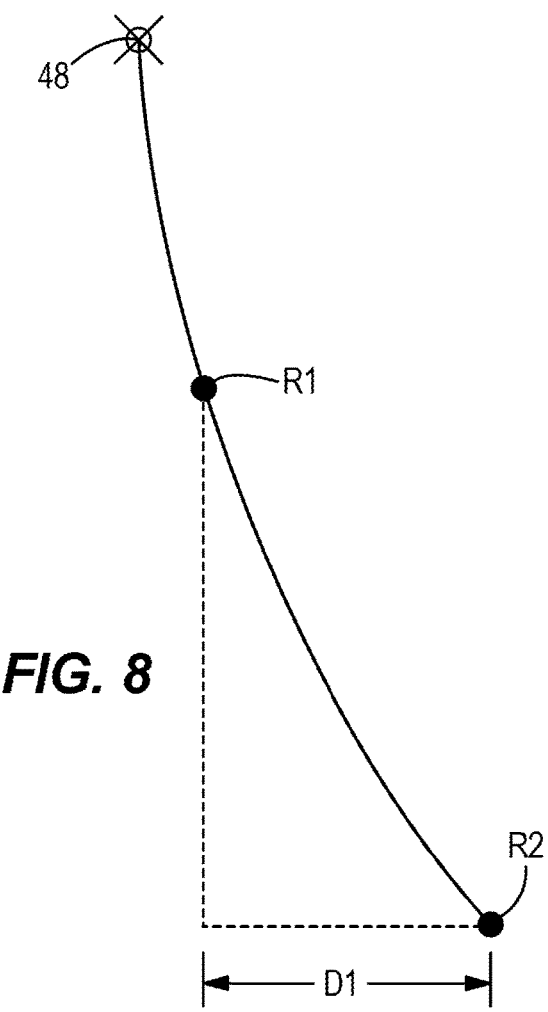
FIG. 8 is a graph depicting wheel deflection under load according to some embodiments.

FIG. 8 is a graph depicting wheel 28 deflection under load as a function of distance from the axis of rotation according to some embodiments when the vehicle is moving. As illustrated in FIG. 8, second point 58*b* of sensor body 44, 62 is deflected a distance D1 in the positive x-direction, which corresponds to the propulsion force direction and direction of vehicle travel. The distance D1 is functionally related to the magnitudes of wheel strain and wheel torque.

Figures 9A, 9B, 9C:
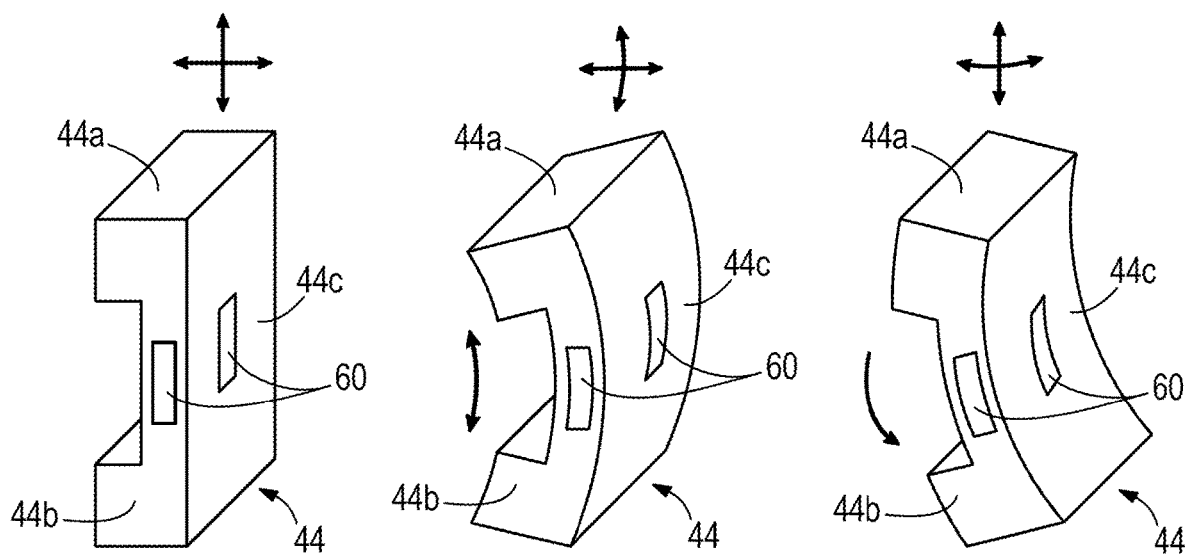
FIGS. 9A, 9B and 9C depict the wheel torque sensor in unloaded, side-loaded and longitudinally-loaded conditions, respectively, according to some embodiments.

FIGS. 9A, 9B and 9C depict the wheel torque sensor according to some embodiments. FIG. 9A depicts the sensor body 44, 60 in an unloaded condition, when the vehicle is at rest; there is no deflection of sensor body 44, 62 and thus no change in the strain as measured by strain gauges 60. FIG. 9B depicts the sensor body 44, 62 in a compressive strain condition which occurs due to wheel side-loading, such as when the vehicle tire is turning among other times. FIG. 9C depicts the sensor body 44, 62 in an elongated or tension strain condition, when the vehicle is moving and the tire and wheel are rotating. As shown in FIG. 9C, cross member 44*c* and second point 58*b* on second leg 44*b* have been deflected in the positive x-direction (direction of vehicle travel) in response to wheel torque in the propulsion force direction.

The measured resistance across terminals of strain gauges 60 changes as a function of wheel torque. As an example of a first wheel torque condition: a positive/tension strain on a first strain gauge 60 at the same time as the existence of a negative/compression strain on a second strain gauge 60, using a physical loading model and calibration of the particular dual sensor/wheel combination, results in the use of a first calibration look-up table (stored in the non-transient memory of ECB 68) and the generation of first processed strain data. Also, the processing of the strain data includes adjusting the outputs of the first calibration look-up table for variations that affect the physical loading model that was used. These variations include tire pressure as sensed by pressure sensor 78, surface temperature as sensed by temperature sensor 82 (which affects material strain coefficients), and the wheel speed and accelerations as determined by IMU 80. The processing of the strain data includes normalizing the strain data into force vectors along the three major axes (x, y and z) based upon the angular position of the wheel obtained from IMU 80. The first processed strain data corresponds to the actual forces/torque on wheel 28 during the first torque condition. The processed strain data, along with processed tire pressure data, is transmitted by wireless transceiver 76 to remote controller 33.

As a second example of a second wheel torque condition: a positive/tension strain on the second strain gauge 60 and a negative/compression strain on the first strain gauge 60, using a physical loading model and calibration of the particular dual sensor/wheel combination, results in the use of a second calibration look-up table (stored in the non-transient memory of ECB 68) and the generation of second processed strain data. The processing of the strain data includes uses the same types of inputs to adjust the output of the second calibration look-up table as discussed above in connection with the first example. The second processed strain data corresponds to the actual forces/torque on wheel 28 during the second wheel torque condition.

Figure 10A:
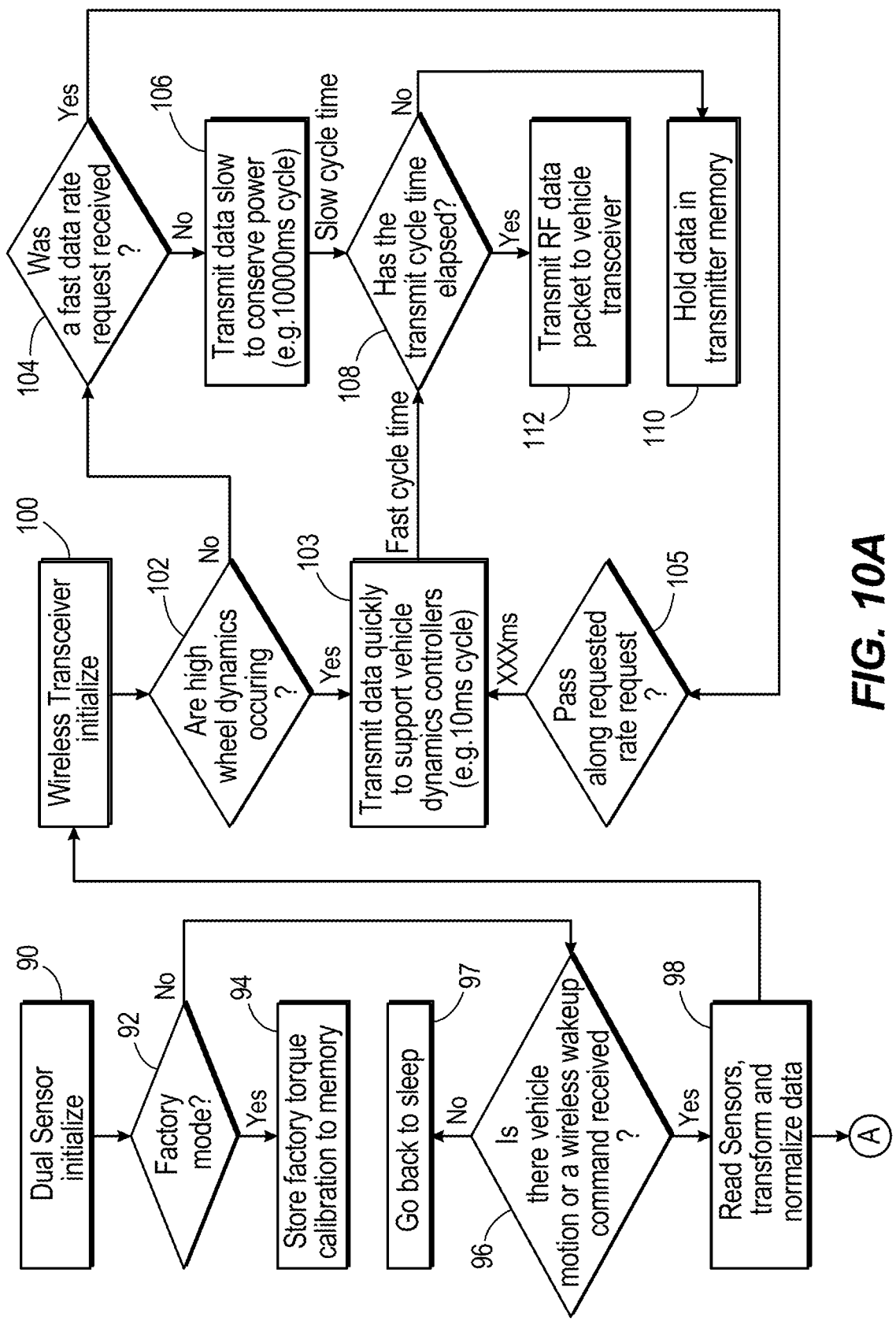
FIGS. 10A and 10B are flow diagrams relating to the dual sensor apparatus according to some embodiments.
Figure 10B:
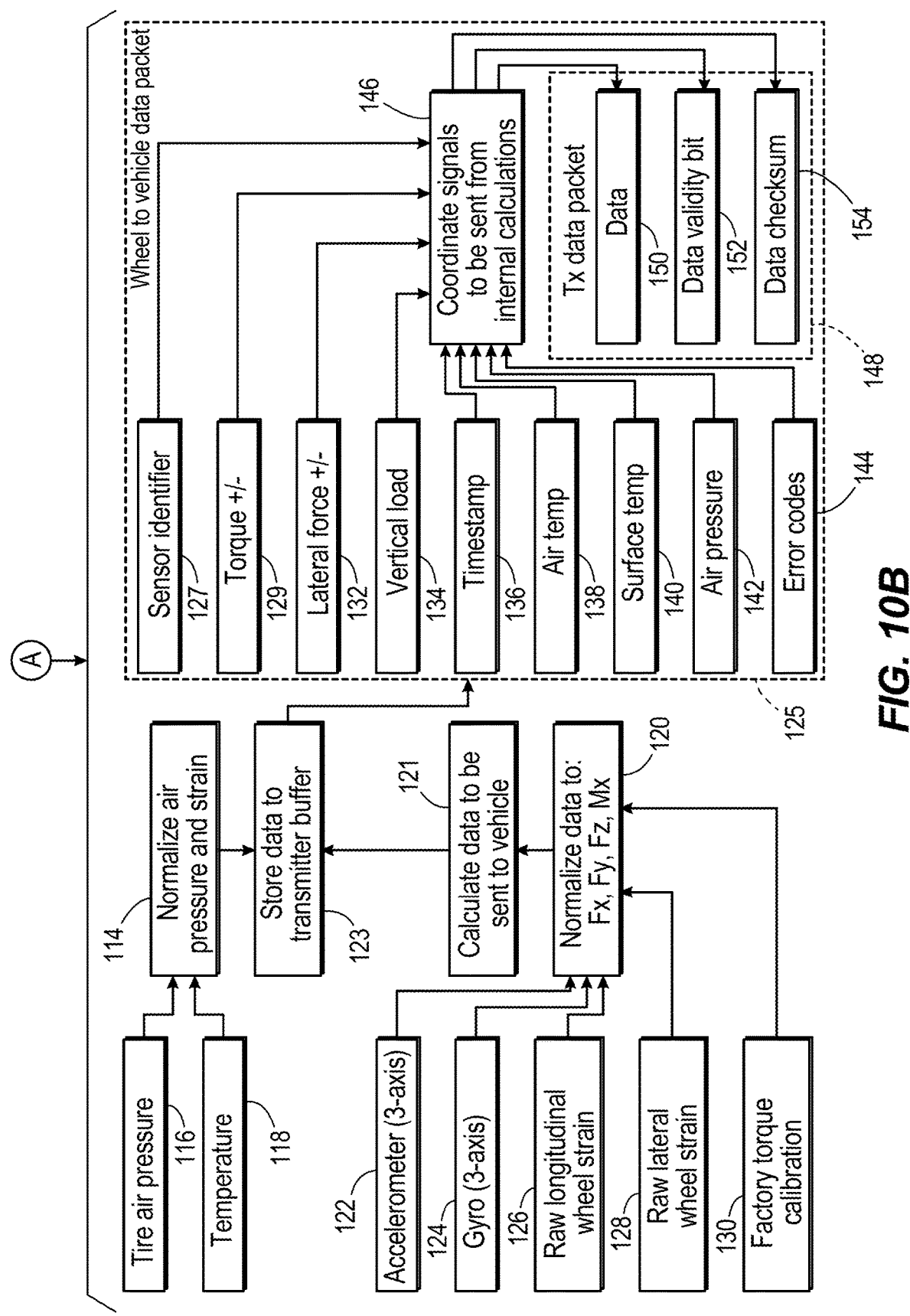

FIGS. 10A and 10B are flow diagrams relating to the dual sensor apparatus according to some embodiments. In FIG. 10A, the dual sensor apparatus (affixed to the wheel 28) is initialized at block 90. At block 92 a decision is made whether the sensor is in factory or programming mode. If the answer is Yes, the factory calibration information (e.g. the calibration look-up tables) are stored in the non-transient memory of dual sensor at block 94. If the answer at block 92 is No, a decision is made at block 96 whether vehicle motion has been sensed or a wireless wake-up signal has been obtained from remote controller 33. If the answer at block 96 is No, the dual sensor returns to sleep mode at block 97. If the answer at block 96 is Yes, the sensors of the dual sensor are read at block 98 and the wireless transceiver 76 is initialized at block 100. A decision is made at block 102 whether wheel dynamics (e.g. wheel rotation) is occurring. If the answer at block 102 is No, a decision is made at block 104 whether a request signal was received from the remote controller that wireless signals should be sent at a higher rate. If the answer at block 104 is No, the wireless signal transmission rate is set at block 106 to slow (e.g. to a cycle of 10000 milliseconds (ms)) to conserve battery power. A decision is made at block 108 whether the transmit time for the wireless signal has elapsed. If the answer is No, the data to be transmitted is saved at block 110 in the memory of wireless transceiver 70. If the answer at block 108 is Yes, wireless transceiver 70 transmits a wireless signal with data to remote controller 33 at block 112.

If the answer at block 102 is Yes, the data is transmitted at a higher rate at block 103. If the answer at block 104 is Yes, the request signal is sent at block 105 and data is transmitted at a higher at block 103.

After the sensors are read at block 98, the raw tire pressure data and the raw strain sensor data are normalized or processed at block 114 of FIG. 10B. As shown in FIG. 10B, air pressure data 116 and surface temperature data 118 are used for normalization at block 114. Also in FIG. 10B, strain data from the strain sensors are normalized or processed at block 120 to generate processed strain data which separates the strain data along the three force vectors (Fx, Fy and Fz) of the force applied to the wheel, and the orientation or position Mx of the strain sensor is determined. As shown in FIG. 10B, the input data used for obtaining the normalized strain data are:

- accelerometer data 122 (along the 3 major axes) from IMU 80;
- gyroscopic or orientation data 124 (along the 3 major axes) from IMU 80;
- raw longitudinal wheel strain data 126;
- raw side-load or lateral wheel strain data 128;
- factory calibration data 130 for the sensor and wheel combination (i.e. the calibration look-up tables relating to wheel torque)

After the data is normalized at block 120, the data to be sent to remote controller 33 are calculated at block 121 and stored in the memory of wireless transceiver 76 at block 123. As shown in block 125 of FIG. 10B, the data included in the data packet to be sent by wireless transceiver 76 includes: sensor identifier 127, torque 129, side/lateral force 132, vertical load (on the wheel) 134, a timestamp 136, the ambient air temperature 138, surface air temperature 140, tire air pressure 142, and error codes 144. This data is processed at block 146 into a final data packet 148 having at least one data field 150, a data validity bit 152 and a data checksum 154.

Figure 11A:
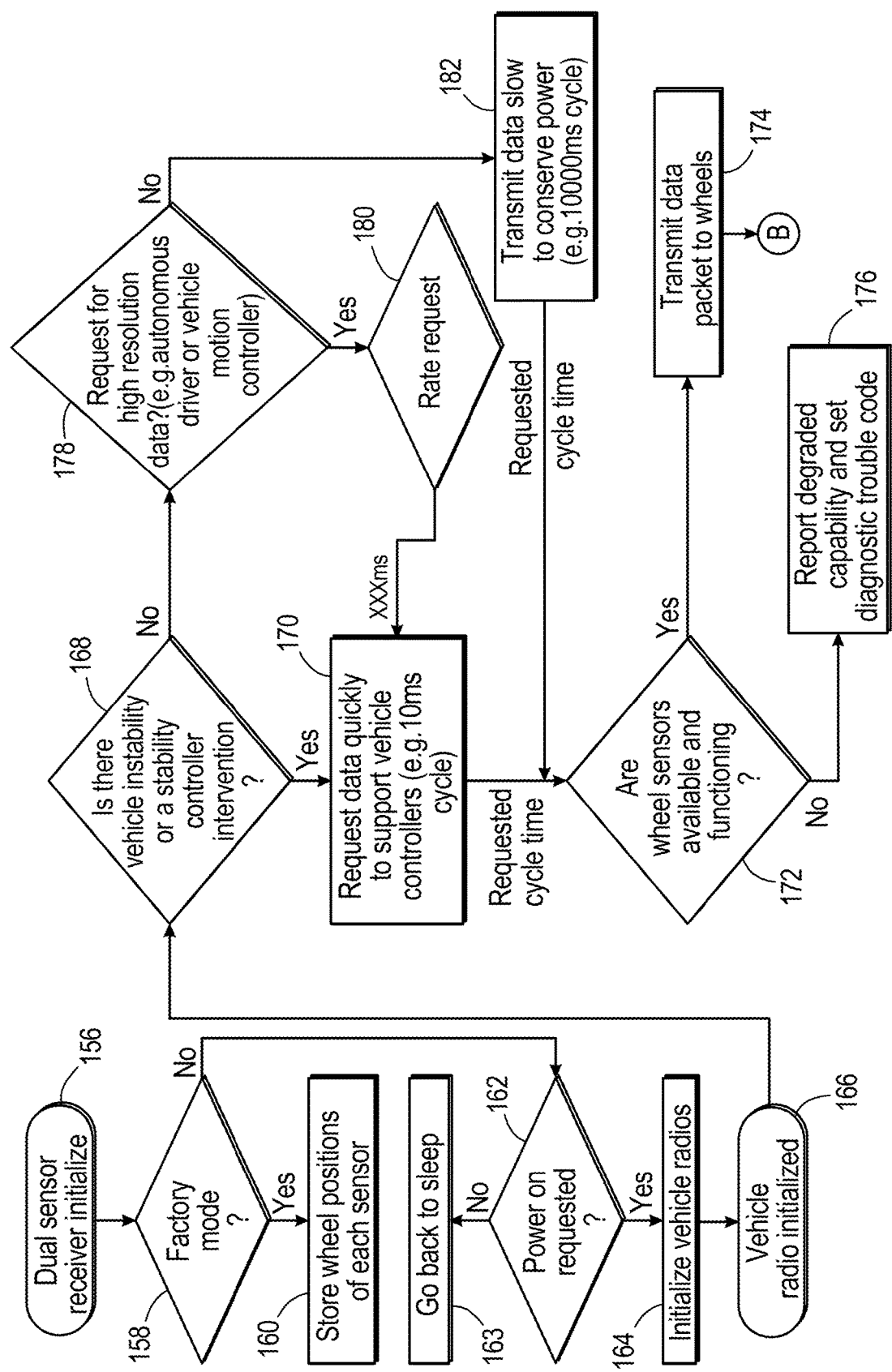
FIGS. 11A and 11B are flow diagrams relating to the remote controller of the dual sensor system according to some embodiments.
Figure 11B:
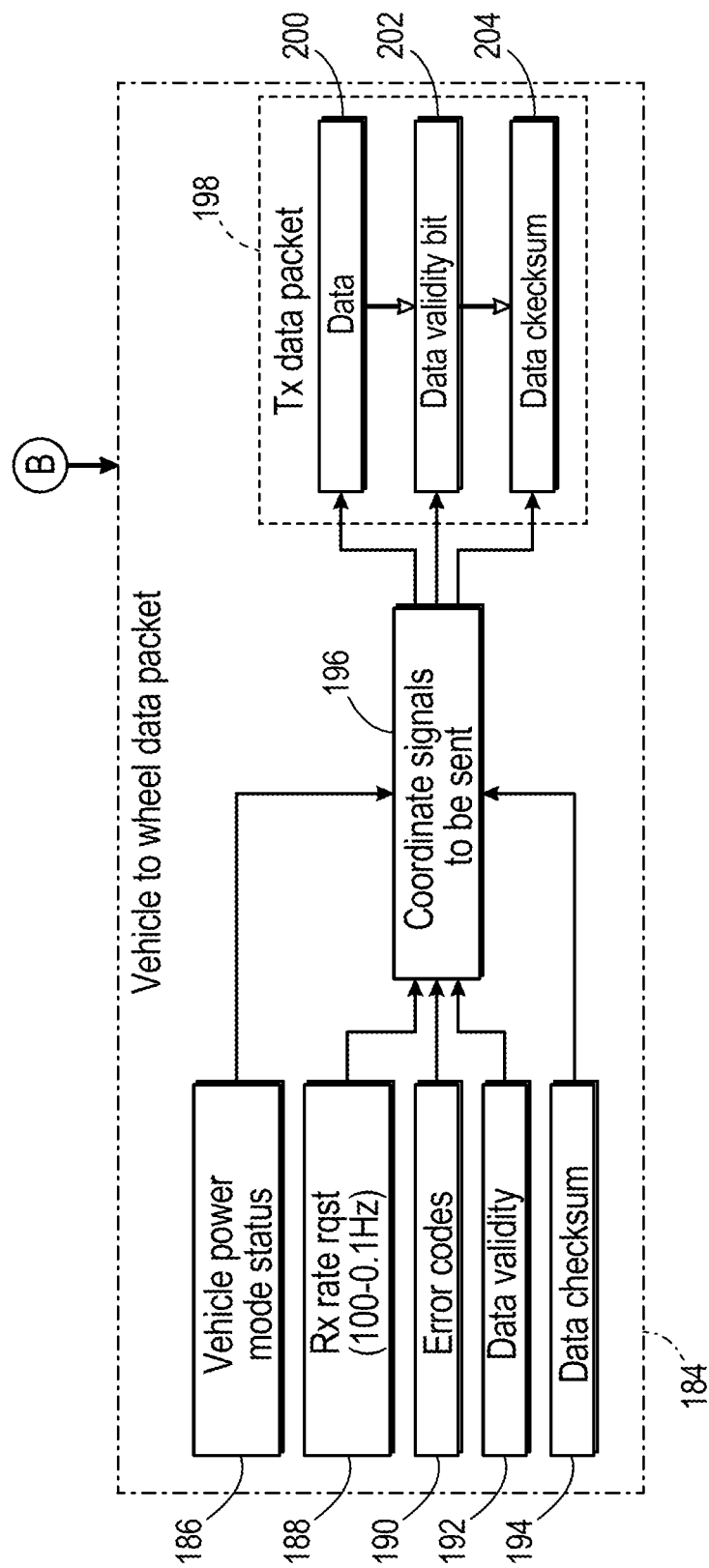

FIGS. 11A and 11B are flow diagrams relating to the remote controller of the dual sensor system according to some embodiments. In FIG. 11A, the receiver circuit of remote wireless transceiver 33*d* is initialized at block 156. A decision is made at block 158 whether the receiver circuit is set to factory or programming mode; if the answer is Yes, the wheel positions (orientations) of each sensor on the wheel is stored at block 160. If the answer is No at block 158, a decision is made at block 162 whether a Power On request has been received. If the answer is No, the remote receiver returns to sleep mode at block 163. If the answer is Yes at block 162, a signal is sent at block 164 to initialize the transmitter circuit of remote wireless transceiver 33*d*, and the transmitter circuit is initialized at block 166.

In FIG. 11A, a decision is made at block 168 whether the ECUs of other vehicle systems (e.g. vehicle stability) are requesting wheel torque data. If the answer is Yes, a request is prepared at block 170 for dual sensor to send the wireless signal at a higher rate (e.g. in 10 ms cycles). Program control flow then proceeds to block 172 where a test is performed to determine whether the wheel sensors are available and functioning. If the answer is Yes. at least one data packet corresponding to the higher rate request is sent to the dual sensor apparatus on the wheel at block 174. If the answer at block 172 is No, a problem with the wheel sensors is reported and a diagnostic error code is set at block 176.

Again in FIG. 11A, if the decision at block 168 is No, a decision is made at block 178 whether higher resolution (higher rate and wheel speed synchronized) information is requested (e.g. for a HAD vehicle or for a vehicle motion controller). If the answer at block 178 is Yes, a decision is made at block 180 to pass along the higher rate request, and program flow control proceeds to block 170. If the decision at block 178 is No, the transmission rate of transceiver 33*d* is set to a slow rate (e.g. 10000 ms cycles) at block 182 to conserve the power of battery 74.

FIG. 11B depicts a sample data packet corresponding to a request signal from transceiver 33*d* to the dual sensor apparatus located on the wheel. In FIG. 11B, block 184 includes the following data inputs that are used to create the request signal: vehicle power mode status 186, the remote controller 33 receive rate (e.g. between 0.1-100 Hz) 188, error codes 190, data validity bit 192 and a data checksum 194. These inputs are processed at block 196 to yield a data packet or request signal 198 to be transmitted by the transceiver 76 of dual sensor 44, 62 to transceiver 33*d* of remote controller 33. Data packet 198 includes a data field 200, a data validity bit 202 and a data checksum 204.

Figure 12A:
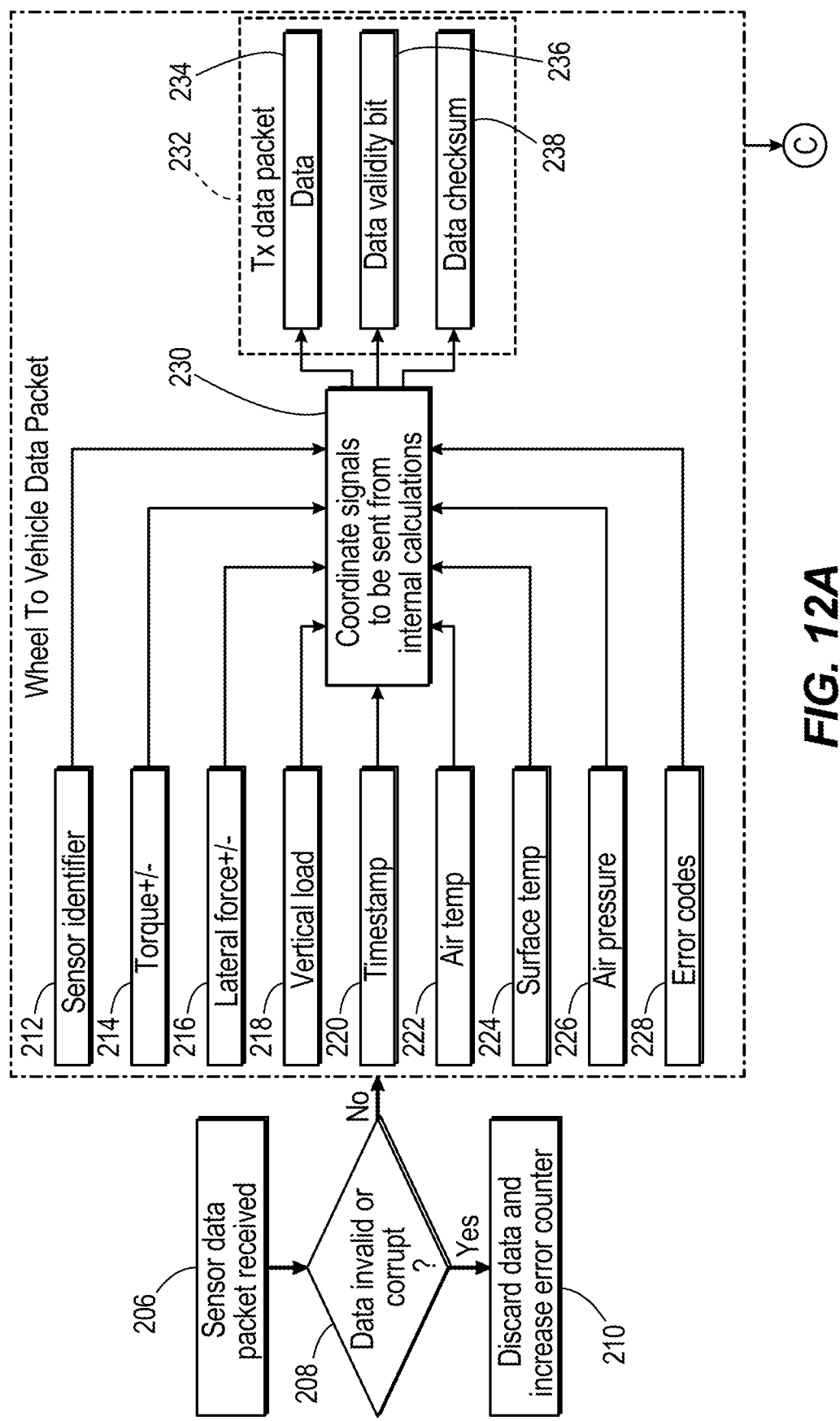
FIGS. 12A and 12B are flow diagrams relating to data generated by the dual sensor system, depicting the data that can be used by vehicular system ECUs which are interconnected with a Controlled Area Network (CAN) bus of a vehicle.
Figure 12B:
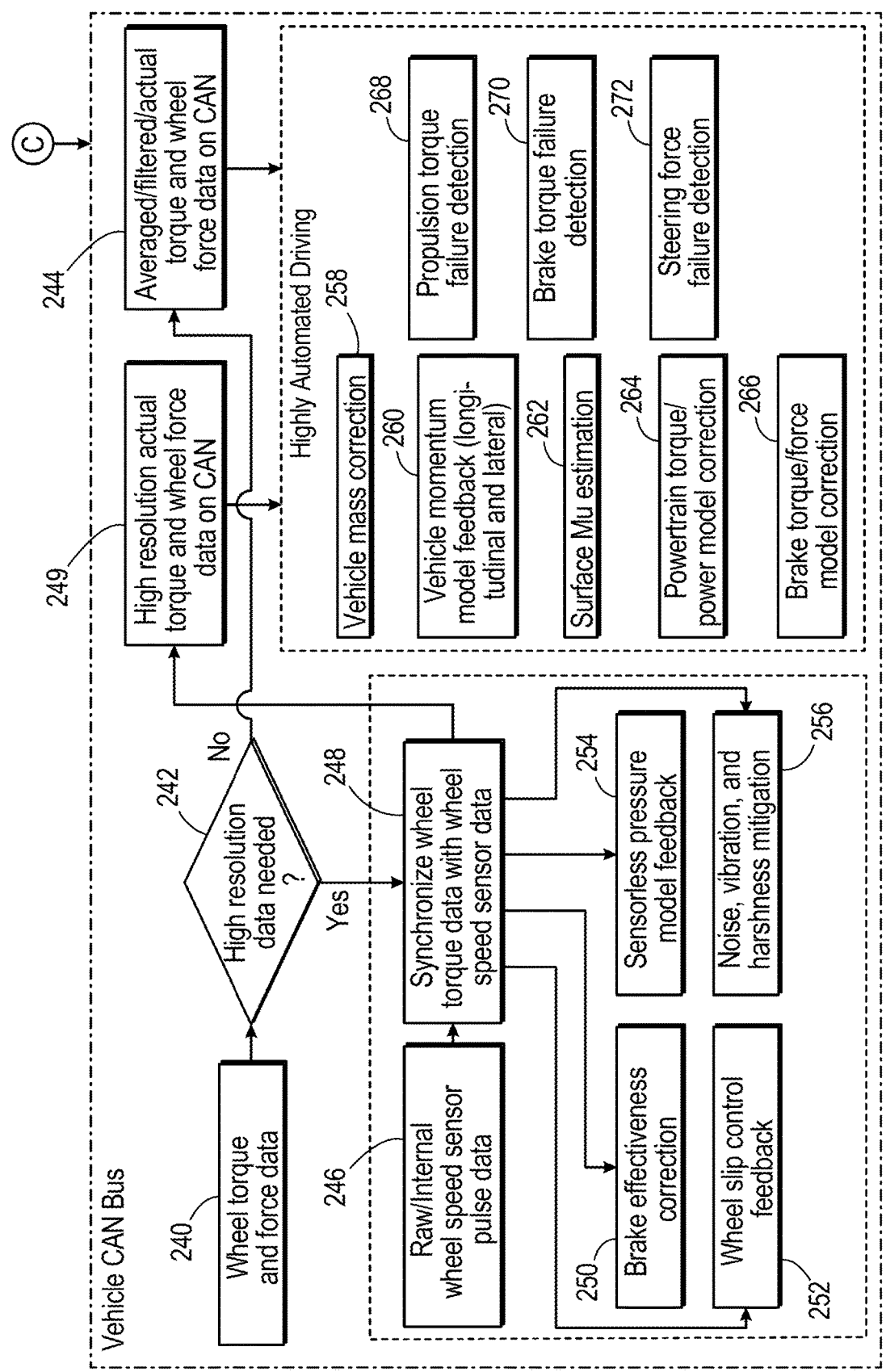

FIGS. 12A and 12B are flow diagrams relating to data generated by the dual sensor system, depicting the data that can be used by vehicular system ECUs which are interconnected with a Controller Area Network (CAN) bus 38 of a vehicle. In FIG. 12A, a data packet is received by transceiver 33*d* of remote controller 33 at block 206. A check is made at block 208 whether the data is invalid or corrupt. If the decision is Yes, the data is discarded at block 210 and an error counter is incremented. If the decision at block 208 is No, the data packet is prepared for transmission to the CAN bus 38. This data packet includes the following fields of information: a sensor identifier 212 (to identify the particular wheel/dual sensor); wheel torque 214; wheel lateral force 216; wheel vertical force 218; timestamp 220 of data acquisition; ambient air temperature 222; wheel surface temperature 224; tire air pressure 226 and error codes 228. This information is processed at block 230 into a single data packet 232 for transmission on CAN bus 38. Data packet 232 includes a data field 232, a data validity bit 236 and a data checksum value 238.

FIG. 12B is a flow diagram depicting how data packet 232 can be used once it becomes available on CAN bus 38. In FIG. 12B, the wheel torque and force data are input at block 240 and a decision is made at block 242 whether high resolution (i.e. higher sampling rate and wheel speed synchronized) data are needed. If the answer at block 244 is No, the data in data packet 232 are made available on the CAN bus 38 in their current form at block 244.

If the decision at block 242 is Yes, then higher resolution data are needed for an electronic stability control vehicle system (such as anti-lock brakes, traction control or stability control). Raw wheel speed sensor data (obtained by wheel speed sensors) are input at block 246 and are synchronized (using timestamps) with wheel torque data at block 248. The synchronized or high resolution wheel torque and wheel force data are then sent to the CAN bus 38 at block 249. The synchronized actual data are also used by vehicular systems to correct the respective estimates they use to optimize their system performances, such as: correction of brake effectiveness at block 250; wheel slip control feedback at block 252; correction of a sensorless pressure model feedback at block 254; and for mitigation of ride noise, vibration and harshness at block 256.

If the vehicle is a highly automated driving (HAD) vehicle, the limited availability of a human driver requires that the vehicle be very precise in its decisions as to the location and movement of the vehicle. For HAD vehicles, the synchronized or high resolution data can be used to correct additional estimates or for additional functions as shown in FIG. 12B, including:

vehicle mass correction at block 258
vehicle momentum model feedback (both longitudinal and lateral/side) at block 260
road slipperiness (low road friction or mu) at block 262
powertrain torque and power model correction at block 264
brake torque/force model correction at block 266
propulsion torque failure correction at block 268
brake failure detection at block 270
steering force failure detection at block 272

Thus, the embodiments provide, among other things, a method and apparatus for controlling performance of a vehicle by providing a dual tire pressure monitoring system and wheel torque sensor. The invention results in a reduction of space requirements and uses a single wireless transmitter/receiver for both systems.

Various features and advantages are set forth in the following claims.

What is claimed is:

1. A combined tire pressure monitoring system (TPMS) and wheel torque sensor system for a vehicle, comprising: a wheel configured to rotate about an axis of rotation; a dual sensor, including a body interconnected with the wheel; a strain sensor interconnected with the body, the strain sensor configured to output strain data related to wheel strain; a temperature sensor interconnected with the body, the temperature sensor configured to sense temperature data; an inertia measurement unit interconnected with the body, the inertia measurement unit configured to measure acceleration forces; a tire pressure sensor interconnected with body, the tire pressure sensor configured to output pressure data related to the fluid pressure in the tire; an electronic control unit, interconnected with the body, the electronic control unit configured to receive the strain data, the temperature data, the acceleration forces, and the pressure data and to output processed strain data corresponding to torque on the wheel and processed pressure data; and a wireless transceiver interconnected with the body and in communication with the electronic control unit, the wireless transceiver configured to generate a wireless signal that includes the processed strain data corresponding to the torque on the wheel and the processed pressure data; and a controller, disposed remote from the wheel, configured to receive the wireless signal from the wireless transceiver; wherein the electronic control unit is configured to normalize the strain data into force vectors along the three major axes (x, y, and z) based upon an angular position of the wheel obtained from the inertia measurement unit.

2. The system of claim 1, wherein the strain sensor includes a strain gauge that has a first end and a second end, and wherein the second end is disposed at a greater radial distance from the axis of rotation than the first end.

3. The system of claim 1, wherein the wheel includes an aperture that receives a valve stem, and wherein the body of the dual sensor is interconnected to the wheel in order to bridge the aperture.

4. The system of claim 3, wherein the body of the dual sensor has two legs and a cross member that connects the two legs, and wherein the strain gauge is interconnected with the cross member.

5. The system of claim 1, wherein the wireless signal includes a digital packet having a first data field corresponding to processed strain data and a second data field corresponding to processed pressure data.

6. The system of claim 1, wherein the controller is configured to wirelessly transmit a request signal to the wireless transceiver; and
wherein the wireless transceiver is configured to transit the wireless signal at a higher rate in response to the request signal.

7. The system of claim 1, wherein the controller is also configured to generate a message on a controller area network (CAN) bus of the vehicle, the message including processed strain data.

8. The system of claim 1, wherein the electronic control unit further comprises:
a non-transitory memory that is configured to store calibration information for the wheel.

9. A dual sensor that senses tire pressure and wheel torque of a vehicle wheel, the wheel having an axis of rotation, the dual sensor comprising: a body configured to he interconnected with the wheel; a strain sensor interconnected with the body, the strain sensor configured to output strain. data related to wheel strain; a temperature sensor interconnected with the body, the temperature sensor configured to sense temperature data; an inertia measurement unit interconnected with the body, the inertia measurement unit configured to measure acceleration forces; a tire pressure sensor interconnected with body, the tire pressure sensor configured to output pressure data; an electronic control unit interconnected with the body, the electronic control unit configured to receive the strain data, the temperature data, the acceleration forces, and the pressure data and to output processed strain data corresponding to torque on the wheel and processed pressure data: and a wireless transceiver interconnected with the body, and in communication with the electronic control unit, the wireless transceiver configured to generate a wireless signal that includes the processed strain data corresponding to the torque on the wheel and the processed pressure data; wherein the electronic control unit is configured to normalize the strain data into force vectors along the three major axes (x, y, and z) based upon an angular position of the wheel obtained from the inertia measurement unit.

10. The dual sensor of claim 9, wherein the strain sensor includes a strain gauge that has a first end and a second end, and wherein the second end is configured to be disposed at a greater radial distance from the axis of rotation than the first end.

11. The dual sensor of claim 9, wherein the body of the dual sensor is configured to bridge an aperture in the wheel that receives a valve stem.

12. The dual sensor of claim 9, wherein the body of the dual sensor has two legs and a cross member that connects the two legs, and wherein the strain sensor is interconnected with the cross member.

13. The dual sensor of claim 9, wherein the electronic control unit further comprises:
a non-transitory memory that is configured to store calibration information for the wheel.

14. The dual sensor of claim 9, wherein the wireless receiver is configured to transmit the wireless signal at a first rate and at a second rate, and wherein the wireless receiver is configured to transmit the wireless signal at the second rate in response to a request signal from a remote controller.

15. A method of monitoring the tire pressure of a vehicle tire disposed on a vehicle Wheel and sensing a wheel torque of the wheel, comprising: affixing a body of a dual sensor to the wheel; generating strain data from a strain sensor interconnected with the body of the dual sensor; generating temperature data from a temperature sensor interconnected with the body of the dual sensor; generating acceleration forces from an inertia management unit interconnected with the body of the dual sensor; generating pressure data from a tire pressure sensor interconnected with the body of the dual sensor; processing the strain data, the temperature data, the acceleration forces, and the pressure data using an electronic control unit -that is interconnected with the body to output processed strain data corresponding to torque on the Wheel and processed pressure data; and wirelessly transmitting a wireless signal to a remote controller using a transceiver interconnected with the dual sensor body, the wireless signal including both the processed strain data corresponding to the torque and the processed pressure data wherein the electronic control unit is configured to normalize the strain data into force vectors along the three major axes (x, y, and z) based upon an angular position of the wheel obtained from the inertia measurement unit.

16. The method of claim 15, wherein the generating of the strain data includes measuring an electrical resistance across the strain sensor.

17. The method of claim 15, further comprising:
transmitting a request signal from the remote controller to the transceiver that causes the transceiver to transmit the wireless signal at a higher rate.

18. The method of claim 15, further comprising:
synchronizing wheel speed data with the processed strain data to yield high resolution strain data corresponding to the torque on the wheel.

19. The method of claim 15, further comprising:
generating a message, using the remote controller, on a controller area network (CAN) bus of a vehicle, wherein the message includes the processed strain data corresponding to the torque on the wheel.

\* \* \* \* \*

UNITED STATES PATENT AND TRADEMARK OFFICE
CERTIFICATE OF CORRECTION

PATENT NO. : 10,807,420 B2
APPLICATION NO. : 15/926387
DATED : March 20, 2018
INVENTOR(S) : Samuel Steele and Kevin M. Danford It is certified that error appears in the above-identified patent and that said Letters Patent is hereby corrected as shown below:

In the Claims

In Claim 9, Column 11, Line 44:
Replace "he" with --be--

In Claim 9, Column 11, Line 46:
Replace "strain. data" with --strain data--

In Claim 9, Column 11, Line 58:
Replace "data:" with --data;--

In Claim 15, Column 12, Line 26:
Replace "Wheel" with --wheel--

In Claim 15, Column 12, Line 37:
Replace "-that" with --that--

In Claim 15, Column 12, Line 38:
Replace "Wheel" with --wheel--

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*